United States Patent [19]

Mitchell et al.

[11] Patent Number: 4,841,476
[45] Date of Patent: Jun. 20, 1989

[54] EXTENDED FLOATING POINT OPERATIONS SUPPORTING EMULATION OF SOURCE INSTRUCTION EXECUTION

[75] Inventors: James A. Mitchell; John F. Bechdel, both of Endicott, N.Y.

[73] Assignee: International Business Machines Corporation, Armonk, N.Y.

[21] Appl. No.: 915,423

[22] Filed: Oct. 6, 1986

[51] Int. Cl.⁴ .................................................. G06F 9/00
[52] U.S. Cl. ....................................................... 364/900
[58] Field of Search ................................. 364/200, 900

[56] References Cited

U.S. PATENT DOCUMENTS 3,881,173  4/1975  Larsen et al. ..................... 340/172.5
4,587,612  5/1986  Fisk et al. ............................ 364/200

OTHER PUBLICATIONS

George Radin, "The 801 Minicomputer", IBM J. Res. Develop., vol. 27, No. 3, May 1983.

*Primary Examiner*—Gareth D. Shaw
*Assistant Examiner*—John G. Mills

*Attorney, Agent, or Firm*—Baker, Maxham, Jester & Meador

[57] ABSTRACT

In a system which emulates execution of source CPU instructions and includes a translating unit (translator) for converting source instructions to target instructions and a target CPU instruction unit for processing and issuing translated target instructions, provision is made for accelerating instruction, translation, issue, and execution when certain source floating point arithmetic instructions are emulated for execution. When a source floating point arithmetic instruction is emulated, a token is placed in a wait queue in the translator to prevent the translation of any source instructions and issue of any target instructions until condition and interrupt information is available and validated. In addition, emulation of source RX-type floating point instructions is enhanced by provision of registers in the instruction unit which receive X-field denoted operands, and which thereby permit a target CPU execution unit to perform the emulation by conducting register-to-register operations.

5 Claims, 3 Drawing Sheets 4,841,476

EXTENDED FLOATING POINT OPERATIONS SUPPORTING EMULATION OF SOURCE INSTRUCTION EXECUTION

CROSS-REFERENCE TO RELATED APPLICATION

This application contains subject matter related to the invention disclosed and claimed in the U. S. Patent Application entitled ACCELERATED VALIDITY RESPONSE PERMITTING EARLY ISSUE OF INSTRUCTIONS DEPENDING UPON OUTCOME OF FLOATING POINT OPERATIONS, Ser. No. 896,879, filed Aug. 15, 1986, of which David A. Hrusecky is the inventor and which is assigned to the assignee of this application. This application is incorporated herein by this reference.

BACKGROUND OF THE INVENTION

This invention is in the field of machine emulation and especially concerns a source which emulates operation of a source CPU by translating source CPU instructions into target CPU instructions for issue and execution by a target CPU. More particularly, the invention relates to extensions of the emulation ability of such a system through the provision of means for accelerating the translating and issuing functions when source floating point arithmetic instructions are being emulated and which emulate the execution of source floating point RX-type instructions by execution of target register-to-register floating point arithmetic instructions.

Emulation is the imitation of the operation of a first ("source") CPU by a second ("target") CPU. The target CPU is specially programmed and architected to permit it to execute programs written for the source CPU. A program written for the source CPU comprises a sequence of source instructions which are provided, one-by-one, to the target CPU. The target CPU responds to each source instruction by executing one or more target instructions.

In U.S. Pat. No. 4,587,612 of Fisk et al., assigned to the present assignee and incorporated herein by reference, an emulation assist processor (EAP) receives a source instruction stream and maps each source instruction to one or more target instructions, the target instructions being passed to an instruction processing unit (IPU) of the target CPU. In the incorporated patent, the EAP converts multi-field source instructions into multi-field target instructions and streams the target instructions to the IPU for processing and issuing.

As is known, when the source CPU comprises a machine such as an IBM 370 host computer (described in U.S. Pat. No. 3,400,371, assigned to the present assignee, and incorporated herein by reference), the source instruction set includes multi-field floating point arithmetic instructions, primarily of the RX-type. Source instruction programs utilizing the IBM 370 instruction set characteristically are conditioned by the state of a condition code (CC), an indicator which is set according to the outcome of certain instructions among which are floating point arithmetic instructions. When an IBM 370 floating point instruction produces an abnormal outcome (such as an all zero result) or attempts an abnormal operation (divide by zero), an interrupt indicator is set which transfers control from the executing program to a supervisory routine for certain interrupt procedures. Emulation of the branching and interrupt features of an IBM 370 source program requires that the target program maintain condition code and interrupt indicators to effectively map program branches and interrupts.

While conceding that the branching and interrupt correspondence between source and target programs must be maintained, it is recognized that the speed of emulation can be enhanced by the ability to reliably predict the state of the condition code and interrupt indicators before the completion of executing floating point arithmetic operations. However, any such enhancement must account not only for the translation of source to target instructions, but also must take into account the issuance of converted target instructions.

One of the potential operational environments of the EAP of U.S. Pat. No. 4,587,612 imposes certain architectural bottlenecks affecting execution of target floating point instructions. In this regard, the instruction unit and floating point unit of the target CPU are interconnected by a 32-bit wide databus. When source RX-type floating point instructions are emulated, an operand denoted in the X field of the source instruction must be fetched from memory for provision to the FPU. Passage of the responsibility for obtaining the X-field operand from memory lengthens the instruction execution time. Execution of a target floating point instruction is further lengthened when the source instruction is an extended RX-type requiring two sequential memory accesses to obtain a 64-bit operand over the 32-bit databus.

THE INVENTION

The invention has application in a system for emulating the execution of source CPU instructions, which system includes a target CPU embracing a memory, a number of functional units, and a target instruction unit which processes and issues translated target instructions for execution by target functional units. The emulation system also includes an instruction translating unit (translator) for receiving and converting source instructions to target instructions. The invention resides in an improvement to the system and has the form of a mechanism for accelerating the translation and execution of floating point instructions. In this regard, the invention includes a token generator in the translator which generates a floating point wait token signal in response to translation of a source floating point instruction. An outcome generator in a floating point functional unit of the target CPU produces completion signals indicative of the outcome of issued target floating point instructions in advance of completion of the execution of the issued instructions. The system includes system means for restraining the translation and issue of instructions in response to the token signal. Finally, a multi-stage wait queue located in the translator and connected to the system means receives and retains the wait token signal when it is generated and extinguishes the token signal in response to the completion signals indicating the outcome of the target floating point instruction translated from the source floating point instruction.

The invention stems from a number of unanticipated observations. The inventors have observed that: if instruction translation and target instruction issue are responsive to an accelerated indication of the execution results of target floating point instructions, translation and issuing, and therefore emulation, can be accelerated; if a source RX-type instruction X-field operand can be obtained prior to translated target instruction issue, a source RX floating point instruction can be emulated by execution of a target RR instruction, thereby obviating a memory access cycle after instruction issue; and if the two halves of the X-field operand of an extended floating point source instruction are obtained on successive memory access cycles, emulation of the source instruction can be emulated a set of target floating point instructions which transfer the operand and initiate execution of an RR target instruction sequence which reduces the number of cycles required to emulate the source instruction.

Therefore, the primary objective of the present invention is to improve the operation of a system which emulates the performance of a source CPU program that includes floating point arithmetic instructions of the RX-type by accelerating the translation of source to target instructions and the issue of converted target instructions.

A further objective of the present invention is to improve the operation of such an emulation system by reducing the time required for target CPU operations that emulate execution of source RX-type floating point arithmetic instructions.

These and other objects and further attendant advantages of the subject invention will become more evident when the detailed description is read in connection with the below-described drawings.

DETAILED DESCRIPTION OF THE PREFERRED EMBODIMENT

Figure 1:
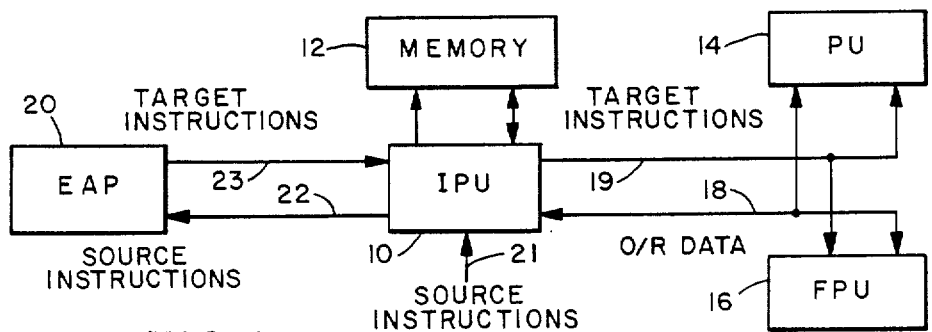
FIG. 1 illustrates the architectural arrangement of a system for emulating a program provided by a source CPU of the IBM 370 type.

FIG. 1 illustrates the application environment of the invention. This environment includes a reduced instruction set computer (RISC) which forms the target CPU. As described by Radin in "The 801 Minicomputer," published in the IBM Journal of Research and Development, Volume 27, No. May 3, 1983, at pages 237-246, such a computer includes separate instruction and data streams sourced by respective caches. In this computer, instructions are obtained from an instruction cache and data from a separate data cache, both of which are located in and managed by an instruction processing unit (IPU) 10. The contents of the caches are replenished by IPU access of a memory 12. The IPU 10 processes cached instructions and issues them for execution by one or more processing units (PU) 14 and a floating point processing unit (FPU) 16. Since the units 10, 12, 14, and 16 form the target CPU, the instructions issued by the IPU 10 are termed target instructions and are issued to the processing units on a target instruction bus 19. Operand and result (O/R) data is exchanged between the IPU 10 and the processing units 14 and 16 on the O/R databus 18.

In the postulated environment, the exemplary 801 computer has a 32-bit architecture which is reflected in a corresponding width for the data and instruction buses 18 and 19. Further, in addition to the data cache, the IPU 10 of the 801 includes a bank of general-purpose registers.

When used as an emulator, the target CPU operates in conjunction with an emulator-assist processor (EAP) 20. In the emulation mode, a program consisting of instructions from a source CPU are streamed through a portion of the data cache in the IPU 10 on the data path 21, 10, 22 to the EAP 20. In the EAP 20, the source instructions are converted into target instructions and inserted into a target CPU instruction stream which does not disturb the normal target CPU instruction execution sequence executed by the IPU 10. The converted instruction stream is provided to the IPU 10 on datapath 23. The cooperative operations of the IPU 10 and EAP 20 in performing instruction conversion and generating the target instruction stream are well explained in the incorporated Fisk Patent and will not be repeated here. However, certain of the structures and functions involved in the instruction conversion must be set out in order to adequately explain the invention.

Figure 2:
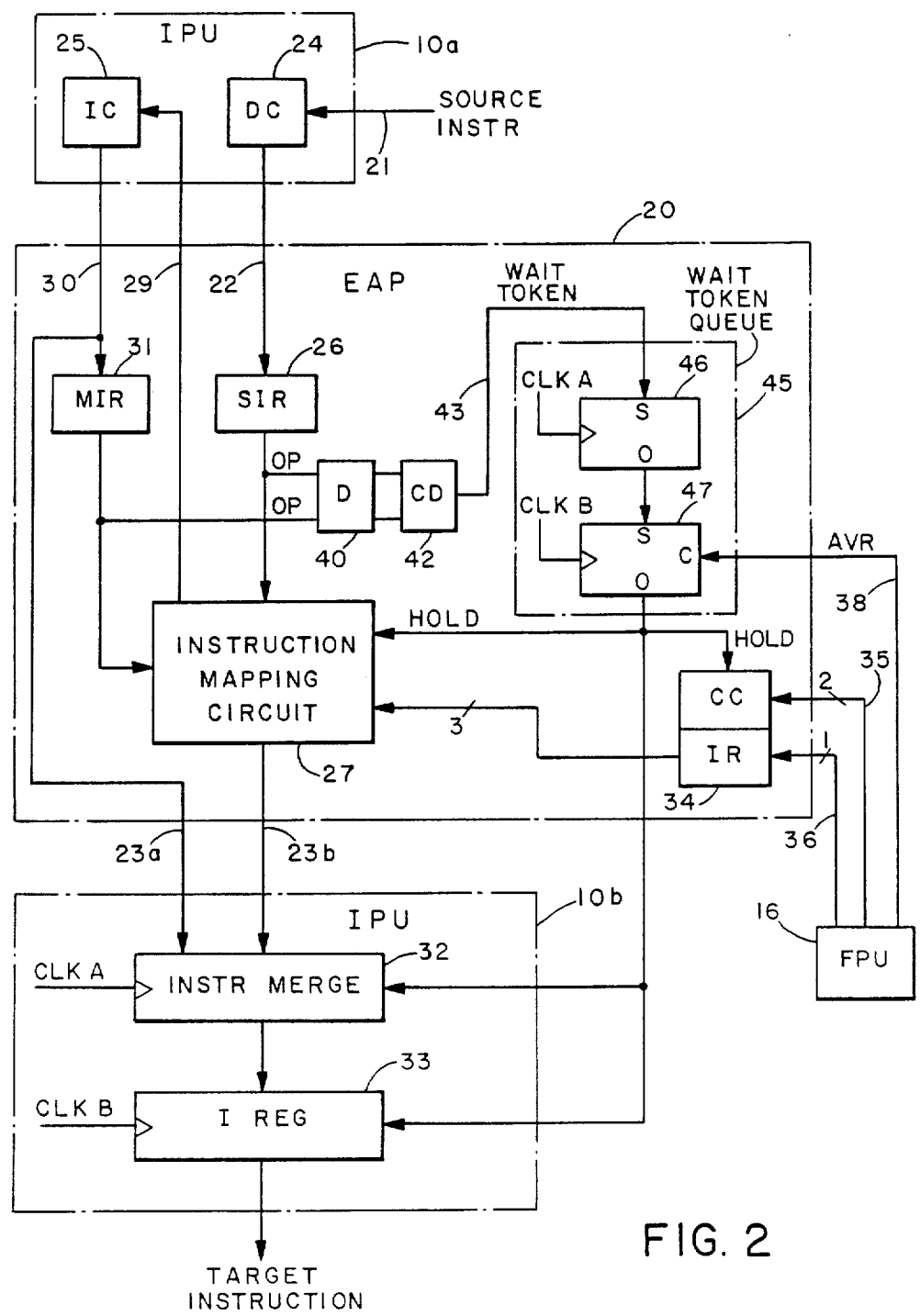
FIG. 2 illustrates in greater detail functional elements of the emulator-assist processor (EAP) and instruction processing unit (IPU) which accelerate the translation and target issuing functions in response to accelerated completion indications provided by a floating point unit (FPU) prior to the completion of target floating point arithmetic operations.

Refer now to FIG. 2, where the EAP 20, IPU 10, and FPU 16 are shown. The IPU is shown in two functional sections 10a and 10b only to facilitate the following discussion; the IPU 10 in fact comprises a single unit. In FIG. 2, the portion 10a of the IPU 10 which receives the source instruction stream on 21 includes a data cache 24 which terminates the source stream, and an instruction cache 25 which contains microinstructions. The source instruction stream is provided to the EAP 20 from the data cache on signal line 22 and staged, instruction by instruction, through a source instruction register (SIR) 25 which provides a platform against which an instruction mapping circuit 27 can operate. As explained in the Fisk patent, the instruction mapping circuit 27 generates a next instruction address which is provided to the instruction cache 25 in the IPU 10, and which results in the provision of a microinstruction from the instruction cache, the microinstruction being provided to the EAP on the signal line 30. The microinstruction on the signal line 30 is staged to the EAP in the microinstruction register (MIR) 31. As is taught in the incorporated Fisk patent, the microinstruction held in the register 31 also includes a next instruction field which can generate the next instruction address on line 29. Thus, a source instruction in the register 26 can result in the generation of one or a sequence of microinstructions which are fed to the EAP on the signal line 30. Relatedly, emulation of a source instruction can involve retrieval of a microinstruction sequence from the instruction cache, and execution of a resulting target instruction sequence by the target processor. The microinstruction provided to the register 31 consists of a control section and a skeleton target instruction. The skeleton target instruction is provided on signal line 23a to an instruction merge register 32 in the IPU 10. As taught in the incorporated Fisk patent, the skeleton instruction consists of an OP code field and register and displacement fields. The control portion of the microinstruction in the register 31 and the operand fields of the source instruction in the register 25 are used by the mapping circuit 27 to fill in zeroed operand and/or control fields of the skeleton instruction in an instruction merge register 32 in the IPU 10. The fill information is provided from the mapping circuit on the signal line 23b. Thus, the signal lines 23a and 23b form the signal line 23 of FIG. 1 on which the target instruction stream is provided to the IPU 10. When an instruction is issued by the IPU 10, it is transferred from the instruction merge register 32 to an instruction register (I REG) 33. When the target instruction resides in the I register 33, the IPU 10 undertakes a course of instruction issue operations, summarized below.

The operational context of the invention assumes a source instruction stream including multi-field instructions such as are included in the IBM 370 CPU instruction set. At least one distinctive format in this set is termed the RX (register/index) format. The RX format has the following form:

OP $R_1$ $X_2$ $B_2$ $D_2$

In an RX instruction, the operation is indicated by the OP code field. A first operand is located in register $R_1$, while the second operand is at a main memory location having the address $X_2+B_2+D_2$. $X_2$ and $B_2$ refer to general registers functioning, for the purpose of the instruction, as index and base registers, while $D_2$ is a displacement. When the instruction is executed, the result is placed in register $R_1$.

As is known, RX-type instructions include a subset of instructions involving arithmetic operations that are performed on floating point operands. Floating point arithmetic is well-understood. Floating point data format, terminology, and operations are reviewed at length in the article by Anderson et al. entitled "The IBM System/360 Model 91: Floating-Point Execution Unit," which appeared in the IBM Journal dated January 1967 at pages 34-53 and in the cross-referenced patent application.

RX-type floating point arithmetic source instructions are converted into floating point arithmetic target instructions by the EAP 20 for issue by the IPU 10 and execution by the FPU 16.

An RX-type floating point arithmetic instruction can produce a result which alters the condition code (CC) or which raises a program interrupt request (IR). As is known, the state of the CC conditions certain branches in the executing source program. An interrupt request will result in transfer of program control from the executing program. Therefore, these indicators must be accounted for in the emulation of a source instruction stream. In the EAP 20, the current state of the CC and IR are maintained in a status register 34. The instruction mapping circuit 27 inspects the contents of the status register 34 in order to undertake branching and interrupt activities, when necessary.

The CC and IR are provided by, among other sources, the FPU 16, where floating point instructions which affect the indicators are performed. The CC and IR are provided on the signal lines 35 and 36, respectively. Also provided by the FPU 16 is an accelerated validity response (AVR) signal on a signal line 38. The AVR is raised by the FPU 16 at the time when the CC and IR validly reflect the outcome of a floating point arithmetic instruction currently being executed by the FPU 16. As taught in the incorporated U.S. patent Application, the FPU 16 can set the CC and IR in advance of the completion of a floating point arithmetic instruction whose result determines their states. When the CC and IR have been generated, the FPU 16 raises the AVR, signalling to the EAP 20 that the contents of the register 34 can be inspected. The time of occurrence of the AVR can range from soon after commencement of a floating point arithmetic instruction to the time of completion of an instruction, which is the time at which the CC and IR are conventionally sampled.

In order to take advantage of the accelerated production of the CC and IR by the FPU 16, the invention provides the EAP 20 with a wait token circuit which notifies the EAP 20 and IPU 10 when a floating point arithmetic target instruction has been translated and issued, restrains further translation and issuance of target instructions until production of the CC and IR in response to execution of the issued floating point arithmetic target instruction, and notifies the EAP 20 and IPU 10 when the CC and IR have been produced, permitting the early resumption of instruction translation and issue.

When a source floating point arithmetic instruction is contained in the register 25, the instruction mapping circuit 27 generates the first address of a microinstruction sequence adapted for translating the source instruction. All microinstruction sequences generated as the result of a floating point arithmetic instruction terminate with a WAIT microinstruction. The WAIT microinstruction is the signal to the invention to begin production of a wait token. In this regard, when the source floating point arithmetic instruction is registered at 26, its OP code field is provided to a conventional decoder (D) 40 which activates a first token precursor signal. When the WAIT microinstruction at the end of the stimulated sequence is registered at 31, the OP code of the microinstruction is also provided to the decoder 40 which generates a second token precursor signal. A coincidence detector (CD) 42 responds to the two token precursor signals by activating a WAIT TOKEN signal on signal line 43. The WAIT TOKEN signal is provided to a wait token queue 45, consisting of a multistage latch sequence including latches 46 and 47. When the WAIT microinstruction is in the microinstruction register 31, a skeleton target floating point instruction is entered under the instruction merge register 32 on the signal line 23a, with the operand field data for the instruction being provided by the instruction mapping circuit 27 on signal line 23b. The WAIT TOKEN signal is clocked from the latch 46 to the latch 47 by one phase (CLK A) of a multi-phase pipeline clock. When the WAIT TOKEN signal enters the latch 47, the latch activates a HOLD signal that is provided to the instruction mapping circuit 27, the instruction merge and instruction registers 32 and 33, and to the status register 34. The HOLD signal prevents alteration of data in the registers 32, 33, and 34 for so long as the HOLD signal is active. In addition, the HOLD signal suspends the operation of the instruction mapping circuit 27.

Concurrent with the transfer of the WAIT TOKEN signal into the latch 47 in response to a second multiphase clock (CLK B), the target floating point instruction shifts from the instruction merge to the instruction register 33 in the IPU 10. In the instruction register 33, the instruction issues and is provided to the FPU 16. The FPU 16 undertakes operations for executing the issued instruction and also operates to set the CC and IR to the states reflecting the outcome of the executed instruction. When the CC and IR have been produced by the FPU 16, the AVR is raised, which clears the latch 47, thereby deactivating the HOLD signal.

When the HOLD signal is deactivated, the current CC and IR are entered into the status register 34 from the FPU 16. When the entry is made, the instruction mapping circuit 27 inspects the contents of the status register 34 to undertake any required branching or interrupt operations. Following deactivation of the HOLD signal and the generation of the next skeleton instruction, a merged instruction will lodge in the register 32 and be transferred for issue to the instruction register 33.

It will be evident to those skilled in the art that the WAIT TOKEN circuit 45 responds to acceleration of the AVR and permits target instruction conversion and issue to take place in advance of the completion of an executing target floating point arithmetic instruction. The skilled artisan will appreciate that this accelerated operation can only enhance the concurrency of operations in the emulator of FIG. 1, thereby increasing the overall speed of its operations.

Figure 3:
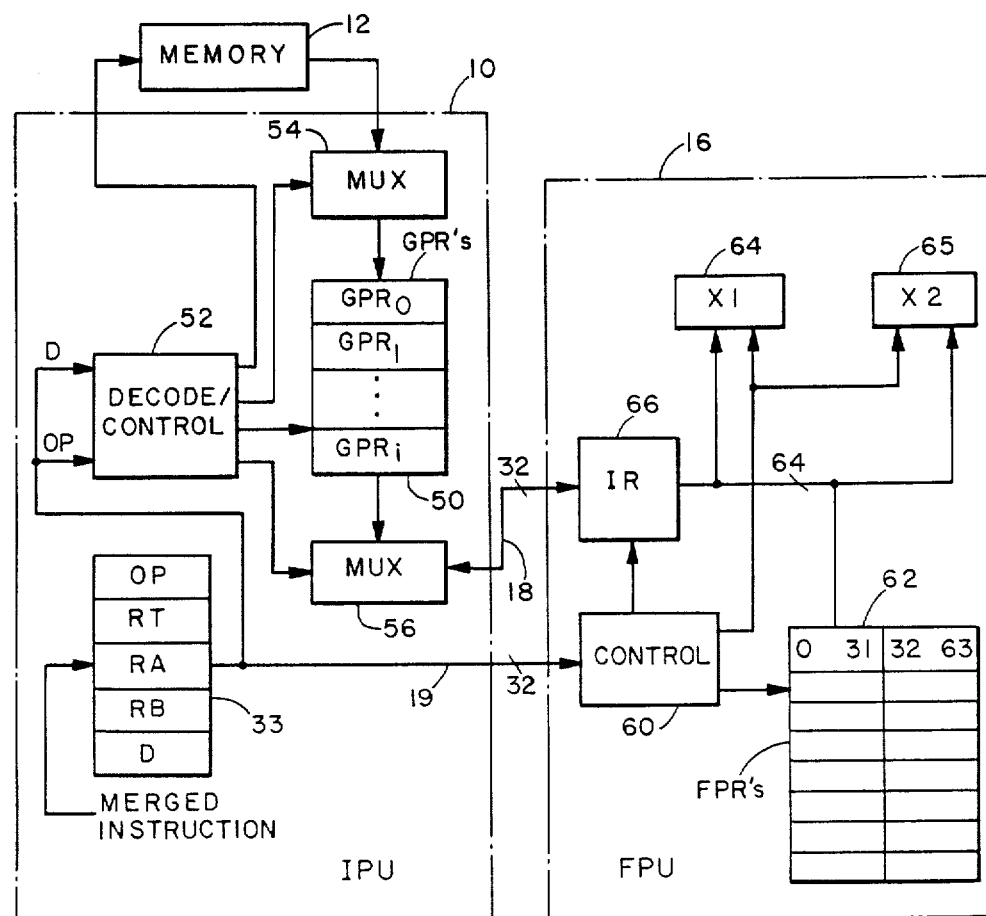
FIG. 3 illustrates the functional elements included in the IPU and FPU that support the emulation of RX-type floating point source instructions by RR-type floating point target instructions.

Reference to FIG. 3 will engender an understanding of how the invention achieves the second of the stated objectives: that of reducing the time required for execution of target machine operations that emulate execution of source RX-type floating point arithmetic instructions. In FIG. 3, the IPU 10 includes, in addition to the instruction register 33, a bank of general purpose registers (GPR) 50, a decode/control circuit 52, and a pair of multiplexers (MUX) 54, 56. The general purpose registers are used for instruction processing operations in the IPU 10. The decode/control circuit conventionally receives OP code information from the OP field of the target instruction in the register 33 and information in the D field of the instruction. The D field specifies a control operation to be executed and identifies the controller responsible for the execution. When designated, the decode/control circuit 52 generates control signals for the MUXES 54, 56 and the GPR's 50 to execute the OP code indicated instruction. When an instruction processing operation is required, the D field identifies the decode/control circuit 52 and enables the circuit to conduct a specified operation. Such an operation includes data fetched from memory, entailing operation of the MUX 54 to conduct the fetched data to a designated GPR. When data is to be exchanged with the O/R databus 18, the circuit 52 operates the MUX 56 to conduct the data and also operates a GPR to source or sink the data. The complement of operations performed by the decode/control circuit 52 also includes a LOAD IMMEDIATE instruction which will cause a value in one of the register fields (RT, RA, or RB) of the target instruction in the register 33 to be entered into a predetermined one of the GPR registers.

FIG. 3 also illustrates, in greater detail, the FPU 16. The FPU 16 includes a control unit 60 which can be designated by a D field of an issued target instruction and which can control and synchronize the operation of FPU resources to conduct the execution of an instruction specified in the OP and D fields of the issued target instruction. The FPU has internal resources including a bank of floating point registers (FPR) 62. The FPR's 62 comprise a plurality of general purpose 64-bit registers for temporary storage of the operands and results of floating point operations conducted by the FPU 16. FPU arithmetic and logic operations are conducted by execution units (X) 64 and 65. As is known, such units can include, for example, a multiply/divide execution unit, an add/subtract/shift unit, and a unit for performing radical operations. Since the IPU and its other associated functional units are assembled in a 32-bit data and instruction architecture, the data interface of the FPU 16 is a 32-bit interface register (IR) 66, which exchanges data with the 32-bit databus 18.

Figures 4, 5:
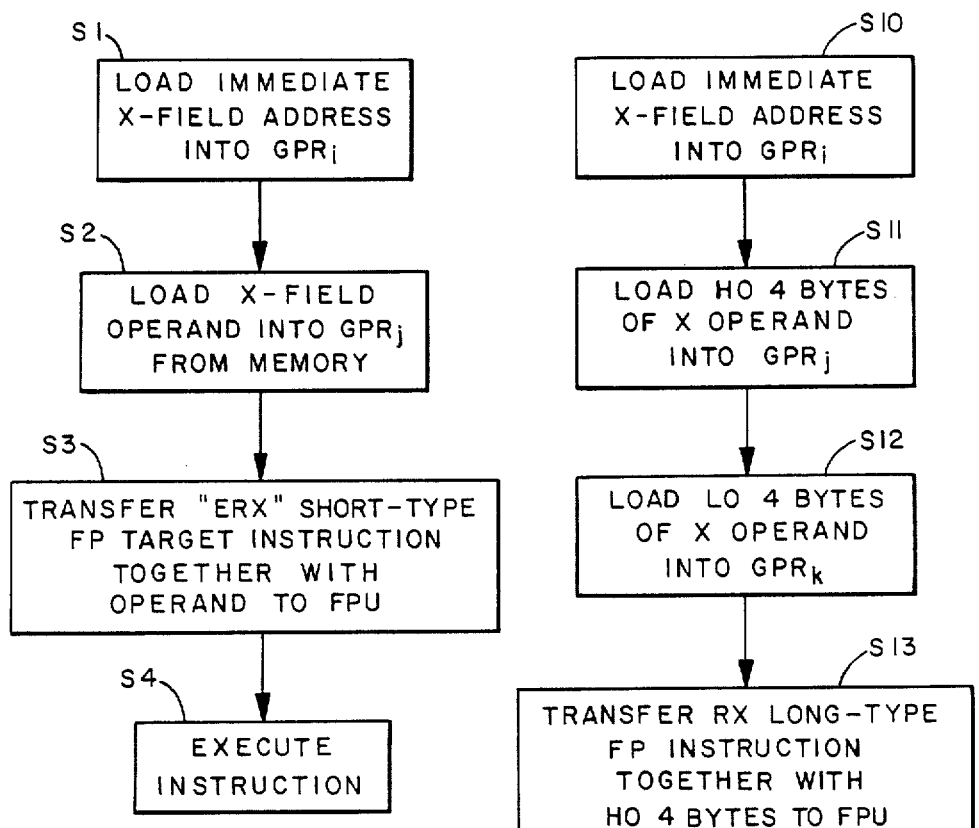
FIG. 4 is a flow diagram illustrating the sequence of operations executed by the arrangement of FIG. 3 in emulating RX short source instructions.
FIG. 5 is a flow diagram illustrating the sequence of operations executed by the arrangement of FIG. 3 in emulating extended RX-type floating point source instructions.

Referring now to FIGS. 3 and 4 together, the operation of the invention in emulating "short" RX-type floating point arithmetic source instructions can be understood. The term "short" indicates that the operands of an RX-type instruction are 32 bits in length. Thus, the data interface 18 between the IPU 10 and FPU 16 can transfer an entire operand result in a single cycle. In step S1 of FIG. 4, when a short source RX-type instruction enters the EAP 20, the EAP will undertake a microinstruction sequence which includes provision of a LOAD IMMEDIATE instruction to the IPU 10, designating the IPU as the unit of execution. The instruction will carry in one of its register fields (RT, RA, or RB) the memory address corresponding to the sum of the $X_2$, $B_2$, and $D_2$ fields of the RX-type instruction. The address will be loaded into $GPR_i$. Next, during the microinstruction sequence, a LOAD instruction to the IPU will result in the operand stored at the address held in $GPR_i$ being loaded into $GPR_j$. This is step S2 in FIG. 4. Now, the final instruction of the microinstruction sequence results in a target floating point arithmetic instruction being loaded into the register 33 for issue. The issued instruction is referred to as an extended-RX (ERX) short-type target instruction. Such an instruction results in the IPU control circuit 52 placing the contents of $GPR_j$ on the databus 18; this is the X-field operand of the source RX instruction. The FPU receives and decodes the issued instruction as a register-to-register (RR) floating point arithmetic instruction for which the first operand is located in the FPR designated by the RA field of the instruction and the second operand is located in the interface register 66, which is designated in the RB field of the issued instruction. The result of the target instruction execution is placed in the FPR denoted in the RT field of the instruction.

The procedure of FIG. 4 is an efficient one for emulating source RX-type floating point arithmetic instructions by execution of target register-to-register floating point instructions. Without the RX enhancement of FIG. 4, it would be necessary to insert the added step of transferring the operand held in $GPR_j$ to a floating point register and then executing a floating point register-to-register floating point instruction. The extra step would be inserted between steps S2 and S3 of FIG. 4.

Reference now to FIGS. 3 and 5 will provide an understanding of how the invention operates to emulate a source RX floating point arithmetic instruction designating a long (64-bit) operand. In the microinstruction sequence undertaken by the EAP in response to an extended RX-type instruction, the sequence of FIG. 4 is initially followed by providing, in step S10, a LOAD IMMEDIATE target instruction for execution by the IPU, which places the X field address of the RX instruction into $GPR_i$. It will be appreciated that the address in $GPR_i$ defines a double-word operand comprising 64 bits. Thus, following the LOAD IMMEDIATE instruction, in steps S11 and S12, two LOAD instructions are sent in sequence, causing the IPU to first load the high order (HO) four bytes of the X-field operand into $GPR_j$ and then the low order (LO) four bytes of the operand into $GPR_k$. In step S13, the penultimate instruction provided to the IPU as a result of the microinstruction sequence undertaken by the EAP consists of an extended RX (ERX) long-type floating point instruction to be issued to the FPU. Essentially, the instruction is recognized by the FPU as an extended register-to-register instruction involving a pair of 64-bit operands, one stored in the FPR designated by the RA field of the instruction. The FPU obtains the second operand from the interface register 66. The second operand is staged to the FPU through the interface register 66 by transferring first the high order four bytes in $GPR_j$ concurrently with issue of the instruction in step S13, and then, in step S14, transferring the low order four bytes in response to the final target instruction resulting from the microinstruction sequence. The final instruction is denoted as FINRX and is executed only by the IPU. Instruction execution consists of transfer of the low order four bytes from $GPR_k$ to the interface register 66. Thus, the execution sequence of FIG. 5 permits efficient emulation of an extended source RX floating point instruction by means of an extended target register-to-register floating point operation. The FINRX dummy instruction adapts the emulation sequence to the 32-bit architecture of the target machine.

Obviously, many modifications and variations of this invention are possible in light of these teachings, and it is therefore understood that the appended claims permit the invention to be practiced other than as specifically described.

We claim:

1. In a system for emulating the execution of source CPU instructions received from a computer external to said system, said system including a memory, a target instruction unit which processes and issues translated target instructions, target functional units for executing target instructions, and an instruction translating unit (translator) for receiving and translating said source instructions to translated target instructions, an improvement for accelerating said translating and issuing, said improvement comprising:

signal means in said translator for generating a floating point token signal in response to translation of a source floating point arithmetic instruction;

outcome means in said floating point unit for generating completion signals indicative of the outcome of the target floating point arithmetic instruction issued in response to said translation, said completion signals being generated in advance of completing the execution of said issued target floating point arithmetic instruction;

a multi-stage wait queue including a wait stage in said translator, said multi-stage wait queue connected to said signal and outcome means for receiving and moving said token signal to said wait stage in response to said translation and for removing said token signal from said wait stage in response to said completion signals; and system means connected to said wait stage, said translator, and said target instruction unit for preventing the translation and issue of instructions until said token is removed from said wait stage.

2. The improvement of claim 1 wherein said source floating point arithmetic instruction is an RX-type instruction which includes an X field for indicating a first operand in a memory location, and which indicates a second operand in a register location, and said target instruction is an RR-type instruction which indicates a first operand in a register location and a second operand in a register location, said target instruction being executable against the operands of said RX instruction and further including:

a register in said target instruction unit for receiving a floating point operand indicated by the X-field of said source instruction;

a data interface means in said floating point unit selectively connectable to said register for buffering said operand to said floating point unit; and multiplexing means in said target instruction unit connected to said register, said memory, and said data interface means for transferring said operand from a location in said memory indicated by said X-field to said register prior to the issue of said target instruction and for connecting said data interface means to said register to transfer said operand concurrently with the issued target RR instruction.

3. The improvement of claim 1 wherein said source instruction is an extended RX-type instruction which includes an X field for indicating a first operand in a memory location, and which indicates a second operand in a register location, and said target instruction is an RR-type instruction which indicates a first operand in a register location and a second operand in a register location, said target instruction being executable against the operands of said RX instruction and further including:

first and second registers in said target instruction unit for receiving respective first and second halves of an extended floating point operand indicated by the X-field of said source instruction;

a data interface means in said floating point unit selectively connectable to said first and second registers for sequentially buffering said first and second operand halves to said floating point unit; and multiplexing means in said target instruction unit connected to said first and second registers, said memory and said data interface means for transferring the first and second halves of said operand from a location in said memory indicated by said X-field to said first and second registers, respectively, prior to the issue of said target (RR) instruction and for connecting said data interface means successively to said first and second registers to transfer said first and second operand halves concurrently with the issue of said target RR instruction.

4. In a method for emulating execution of a source floating point RX-type instruction (source instruction), said method executable by an emulation system including a memory for storing operands, a Fisk-translator for translating said source instruction into an RR-type target floating point instruction (target instruction), a target system instruction unit for issuing said target instruction, and a target system floating point unit for executing said target instruction, an improvement comprising steps of:

providing a source instruction in the form of RX-type floating point instruction from an instruction source, said RX-type instruction including an X field for indicating a memory location containing an operand;

moving the operand indicated by said X-field of said source instruction to a register located in said instruction unit;

assembling and issuing a target instruction to the floating point unit for execution using operands of said source instructions;

concurrently with said issuing of said target instruction, transferring said operand from said instruction unit register to said floating point unit; and executing said target instruction by combining said operand with an operand contained in said floating point unit.

5. In a method for emulating execution of an extended source floating point RX-type instruction (source instruction), said method executable in an emulation system including a memory for storing operands, a Fisk-type translator for translating said source instruction into an RR-type target floating point instruction (target instruction) for issuing said target instruction, and a target system floating point unit for executing said target instruction, an improvement, comprising the steps of:

providing a source instruction in the form of an RX-type floating point instruction from an instruction source said RX-type instructing including an X field for indicating a memory location containing an operand with a first half and a second half;

moving said first half of said operand indicated by the X field of said RX-type instruction into a first register located in said instruction unit;

moving said second half of said operand into a second register located in said instruction unit;

in response to said source instruction, assembling and issuing a target instruction to the floating point unit for execution using operands of said source instruction;

concurrently with the issue of said target instruction, transferring said first operand half from said first register to said floating point unit;

transferring said second operand half from said second register to said floating point unit; and executing said target instruction by combining said first operand with a second operand in said floating point unit.

* * * * *